M. TIBBETTS.
COUPLING DEVICE.
APPLICATION FILED SEPT. 14, 1916.
1,332,962. Patented Mar. 9, 1920.
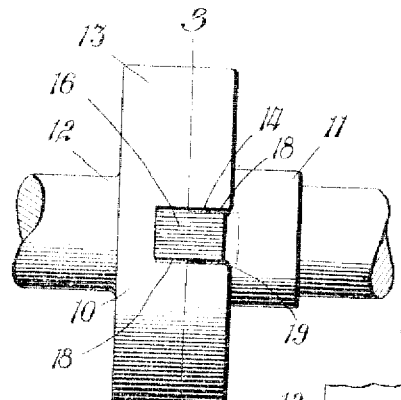
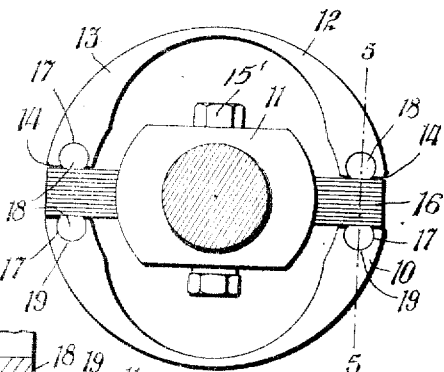
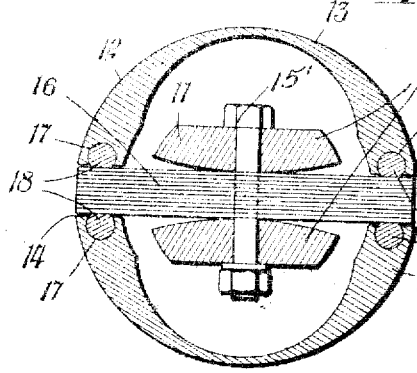
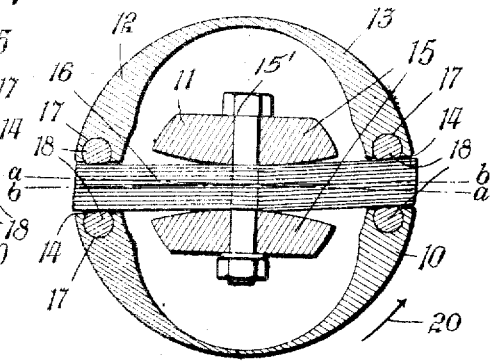
Witness: G. F. Baker
Inventor: Milton Tibbetts

UNITED STATES PATENT OFFICE.

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

COUPLING DEVICE.

1,332,962.  Specification of Letters Patent.  Patented Mar. 9, 1920.

Application filed September 14, 1916. Serial No. 120,088.

*To all whom it may concern:*

Be it known that I, MILTON TIBBETTS, a citizen of the United States, and resident of Detroit, Wayne county, State of Michigan, have invented certain new and useful Improvements in Coupling Devices, of which the following is a specification.

This invention relates to improvements in spring connections and particularly to means for transmitting power through a spring device.

One of the objects of the invention is to provide a multiple plate spring with a connection at one end for clamping the plates together as the spring is flexed.

Another object of the invention is to provide means by which power is transmitted through spring mechanism whereby a certain variation in alinement of the elements is allowed and a variable and yieldable driving connection is supplied without noise or shock.

Another object of the invention is to provide means for increasing the resistance of the spring mechanism as the strength of the power to be transmitted is increased.

Other objects of the invention will appear from the following description taken in connection with the drawing which forms a part hereof, and in which:—

Figure 1 is an elevation view of a power transmitting device embodying the invention;

Fig. 2 is a view from the right of Fig. 1;

Fig. 3 is a transverse sectional view taken on the line 3—3 of Fig. 1;

Fig. 4 is a view similar to Fig. 3 showing the relative position of the members in operation; and Fig. 5 is a transverse sectional view on the line 5—5 of Fig. 2.

Referring to the drawing, the device 10 is shown as a coupling device and it comprises coupling members 11 and 12. On the member 12 is a head or element 13 provided with diametrically opposed slots 14. One end of the member 11 is forked shaped as shown at 15 and secured within the fork are spring plates 16 the ends of which enter the slots 14 when the coupling members are in engagement. Means such as a bolt 15' may be used to secure the plates to the forked ends of the member 11.

In the element 13, at either side of each of the slots 14 are round holes 17 having their sides opening into the slots as shown. In these holes are inserted wear pieces 18 adapted to contact with the sides of the spring plates. By reason of such wear pieces, the spring plates are held firmly in position within the slots and shock and noise are obviated. As shown, the wear pieces are substantially cylindrical so as to turn freely in the holes, one side only being shown flattened slightly for surface contact with the plates, and if desired the edges of the holes at their ends may be peened over as at 19 to retain the wear pieces in place.

Consider the driving action as transmitted from the member 12 to the member 11 through the head 13 and plates 16. As shown in Fig. 4 the member 12 is moved in the direction of the arrow 20 and the spring plates 16 are bent from the position designated by the line $a$—$a$ to that designated by the line $b$—$b$ before the inertia of the member 11 is overcome. Since the wear pieces 18 turn freely in the holes 17 the swinging movement of the plates is transmitted in part to the wear pieces and they take the position shown in Fig. 4. The action of the wear pieces 18 would be the same if the driving operation were in the other direction.

As the plates 16 are flexed they are clamped more tightly between the sides of the slot thus increasing the frictional resistance between the contacting plates. This increase in the clamping action results from the change in the position of the spring plates in the slots 14. When the spring plates are not under tension, as in Fig. 3, they extend parallel to the walls of the slots, while in their flexed position as shown in Fig. 4, the plates extend through the slots at an angle, causing the sides of the slot to grip them closer.

While only one embodiment of the invention has been shown and described it is apparent that other embodiments may be used without departing from the spirit or scope of the invention as set forth in the annexed claims.

Having thus described my invention, what I claim and desire to secure by Letters Patent is:—

1. A power transmitting device comprising in combination a plurality of spring plates and pieces carried by said device on either side of said plates and acting to clamp the plates more tightly as the power applied to said plates increases, said pieces being relatively movable with respect to each other.

2. A power transmitting device comprising in combination a plurality of spring plates and means carried by said device and acting on said plates as the power applied to the spring plates increases to increase the frictional resistance between the adjacent plates, said means being relatively movable with respect to each other.

3. A coupling device comprising two coupling members, spring plates secured to one of said members, a coupling element on the other of said members, said element being provided with diametrically opposed slots in which said spring plates seat, and freely rotatable wear pieces in said slots at either side of said plates, said wear pieces having surfaces adapted to clamp the spring plates more tightly as the said plates are flexed.

4. A coupling device comprising two coupling members, spring plates secured to one of said members and a coupling element on the other of said members, said element being provided with diametrically opposed slots in which said spring plates seat, and freely rotatable substantially cylindrical wear pieces mounted in said element and projecting into said slots at either side of said plates said wear pieces having surfaces adapted to clamp the spring plates more tightly as the said plates are flexed.

5. A coupling member provided with diametrically opposed slots, and round holes, one at either side of and opening into said slots and wear pieces loosely mounted in said holes and projecting into said slots, said wear pieces having surfaces adapted to be moved toward each other as said coupling member is rotated.

6. The combination with a multiple plate spring of means for securing the plates together at one point of the spring and means at one end of the spring and located on either side of said plates adapted to clamp the plates together as the spring is flexed, said clamping means being relatively movable with respect to each other.

7. In combination with relatively movable parts of a multiple plate spring secured to one of said parts and extending adjacent the other of said parts and means carried by said last named part for clamping the plates together as the parts are moved relatively to each other, said means being relatively movable with respect to each other.

8. The combination with two relatively movable parts, of a multiple plate spring secured to one of said parts and extending adjacent the other of said parts, and relatively movable clamping pieces on the other of said parts between which the end of said spring extends, said pieces being so arranged that a relative movement of the parts changing the angle of the spring relative to the clamping pieces causes a clamping action of the latter on the spring.

9. The combination with two relatively movable parts of a multiple plate spring secured to one of said parts and extending adjacent the other of said parts, freely rotatable substantially cylindrical wear pieces mounted in the other of said parts between which the end of said spring extends, said pieces having the sides contacting with said spring slightly flattened whereby the wear pieces are rotated and said spring is clamped more tightly, as the parts are moved relatively to each other.

10. A coupling device comprising two coupling members, spring plates secured to one of said members and a coupling element on the other of said members, said element being provided with a slot in which said spring plates seat, freely rotatable substantially cylindrical wear pieces mounted in said element and projecting into said slot at either side of said plates, said pieces having the projecting edges slightly flattened.

In testimony whereof I affix my signature.

MILTON TIBBETTS